(12) United States Patent
Xiao et al.

(10) Patent No.: US 11,102,924 B2
(45) Date of Patent: Aug. 31, 2021

(54) GARDEN TOOL AND CONTROL BOX THEREOF

(71) Applicant: Globe (Jiangsu) Co., Ltd., Jiangsu (CN)

(72) Inventors: Yu Xiao, Jiangsu (CN); Shouchuan Feng, Jiangsu (CN); Yu Wang, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 139 days.

(21) Appl. No.: 16/720,525

(22) Filed: Dec. 19, 2019

(65) Prior Publication Data

US 2020/0196521 A1 Jun. 25, 2020

(30) Foreign Application Priority Data

Dec. 20, 2018 (CN) .......................... 201811564678.7

(51) Int. Cl.
*A01D 34/68* (2006.01)
*A01D 34/82* (2006.01)
*A01D 101/00* (2006.01)

(52) U.S. Cl.
CPC ....... *A01D 34/6806* (2013.01); *A01D 34/824* (2013.01); *A01D 2034/6825* (2013.01); *A01D 2034/6843* (2013.01); *A01D 2101/00* (2013.01)

(58) Field of Classification Search
CPC .............. A01D 34/6806; A01D 34/824; A01D 2034/6825; A01D 2034/6843; A01D 2101/00
See application file for complete search history.

(56) References Cited

U.S. PATENT DOCUMENTS

| 5,442,901 | A   | * | 8/1995  | Niemela ............ A01D 34/6806 |
|           |     |   |         | 180/65.6                          |
| 6,078,015 | A   |   | 6/2000  | Martinez                          |
| 8,312,946 | B2  |   | 11/2012 | Lahey et al.                      |
| 9,163,707 | B2  | * | 10/2015 | Helin .................... A01D 34/006 |
| 9,185,843 | B2  |   | 11/2015 | Kaskawitz et al.                  |
| 9,403,435 | B2  |   | 8/2016  | Bejcek                            |
| 2003/0000192 | A1 | * | 1/2003 | Busboom ........... A01D 34/6806 |
|           |     |   |         | 56/10.8                           |
| 2010/0064650 | A1 | * | 3/2010 | McCane ............. A01D 34/824 |
|           |     |   |         | 56/10.8                           |
| 2012/0317949 | A1 |   | 12/2012 | Abe et al.                        |

(Continued)

OTHER PUBLICATIONS

European Search Report and Search Opinion in related European Patent Application No. 19218097.4 dated Apr. 30, 2020; 5 pages.

*Primary Examiner* — Abigail A Risic
(74) *Attorney, Agent, or Firm* — Rooney IP, LLC

(57) ABSTRACT

A control box and a garden tool fitted with the control box. The control box includes a self-propelled trigger unit including a self-propelled control switch S, a lever and a control handle matching with the self-propelled control switch S; and a casing being provided with a receiving cavity. The self-propelled triggering unit is at least partially disposed in the receiving cavity. The lever abuts and triggers the self-propelled control switch S when the control handle is pulled to abut the lever and the control handle swings up and down in a plane where a side wall of the casing is located. The control box has reasonable switch distribution and is easy to operate.

10 Claims, 7 Drawing Sheets

(56) References Cited

U.S. PATENT DOCUMENTS

| | | | |
|---|---|---|---|
| 2013/0081500 A1* | 4/2013 | Helin | A01D 34/006 74/473.3 |
| 2014/0208709 A1 | 7/2014 | Helin et al. | |
| 2016/0037719 A1* | 2/2016 | Bian | A01D 69/02 56/10.8 |
| 2016/0324065 A1* | 11/2016 | Smith | A01D 34/52 |
| 2018/0077862 A1 | 3/2018 | Smith | |
| 2020/0329638 A1* | 10/2020 | Yuan | A01D 34/006 |

* cited by examiner

GARDEN TOOL AND CONTROL BOX THEREOF

CROSS-REFERENCE

The present application claims priority to CN patent application Ser. No. CN201811564678.7 filed on Dec. 20, 2018, the contents of which is fully reflected herein.

TECHNICAL FIELD

The present invention relates to the field of garden tools, and in particular to a control box and a garden tool having the control box.

BACKGROUND ART

Lawn mower, also known as a weeder, a grass mower, a lawn trimmer, is a mechanical tool widely used to mow lawns, vegetation, etc. Using the lawn mower to mow the grass can not only save the working time of the weeding worker, but also make the lawn more beautiful and pleasing.

A lawn mower generally comprises a cutter deck, a blade, a walking mechanism, a motor, a handle, and a control mechanism, and the handle is provided with a switch box that is convenient for the operator to operate and control. The lawn mower walks on the ground and performs a cutting operation by virtue of the thrust applied by the operator to the handle, so that the operator has a large the labor intensity when operating the push-on lawn mower.

The lawn mower with self-driving function no longer needs the operator's strenuously pushing. This lawn mower is equipped with a driving motor to drive the front or rear wheel of the mower, and the operator can control the walking speed or the backward movement of the lawn mower simply by the operating control mechanism when operating. However, the handle structure and function of the lawn mower with a self-drive function are relatively simple, and a plurality of mechanical switches are usually used to control various functions of the lawn mower. The distribution of mechanical switches is not reasonable, and the operation process is too complicated, inconvenient and easy to cause user confusion and misuse.

In view of the above problems, it is necessary to provide an improved garden tool and control box thereof to solve the above problems.

SUMMARY OF INVENTION

In response to the deficiencies of the prior art, the solution provided by the present invention is a control box and a garden tool fitted with the control box, the control box in the invention has reasonable switch distribution and is easy to operate, thereby effectively improving the user experience.

To achieve the above object, the present invention provides a control box comprising: a self-propelled trigger unit including a self-propelled control switch S, a lever matching with the self-propelled control switch S and a control handle; and a casing being provided with a receiving cavity for partially receiving the self-propelled trigger unit; the lever abutting and triggering the self-propelled control switch S when the control handle is pulled to abut the lever and the control handle swinging up and down in a plane where a side wall of the casing is located.

In some embodiments, the control box further comprises an activation unit and an operation triggering unit; the activation unit includes a main motor control switch B, an activation button, a slider and a first elastic member for resetting the slider; the slider abuts and triggers the main motor control switch B under the action of the activation button; and the operation triggering unit includes a main motor control switch A, an operating handle, and a second elastic member for resetting the operating handle; the operating handle abuts and triggers the main motor control switch A when pulled; and the main motor control switches A and B, the slider, the first elastic element and the second elastic element are received in the receiving cavity, and the activation button and the operating handle are at least partially received in the receiving cavity.

In some embodiments, the casing is provided with a guiding member, and the slider is provided with a fitting member cooperating with the guiding member; the slider slides along the guiding member under the action of the guiding and fitting members.

In some embodiments, the activation button comprises a pressing portion and a push rod connected to the pressing portion, the push rod is coupled to the slider and pushes the slider to slide when the pressing portion is pressed.

In some embodiments, the operating handle comprises a first handle and a second handle respectively located at two sides of the casing, and the first handle is provided with a positioning post, the second handle is provided with a displacement slot cooperating with the positioning post; and the second or first handle synchronously rotates under the action of the positioning post and the displacement slot when the first handle or the second handle is pulled.

In some embodiments, the upper surface of the casing is located in a first plane, and the first and second handles swing back and forth in the first plane.

In some embodiments, the control box is also provided with a third resilient element for resetting the control handle.

In some embodiments, the control box is further provided with a speed control unit, the speed control unit comprises a speed control knob and a variable electronic component; the variable electronic component is provided with a driven gear, and the speed control knob is provided with a driving gear which is matched with the driven gear.

In some embodiments, a fourth elastic element is further disposed between the speed control knob and the casing.

The invention also provides a garden tool, comprising a handle and a control box as afore, the control box is fitted on the handle and obliquely facing the user.

The beneficial effects of the present invention are: the control box of the invention has reasonable switch distribution and simple operation, thereby effectively improving the user experience.

DETAILED DESCRIPTION

Figure 1:
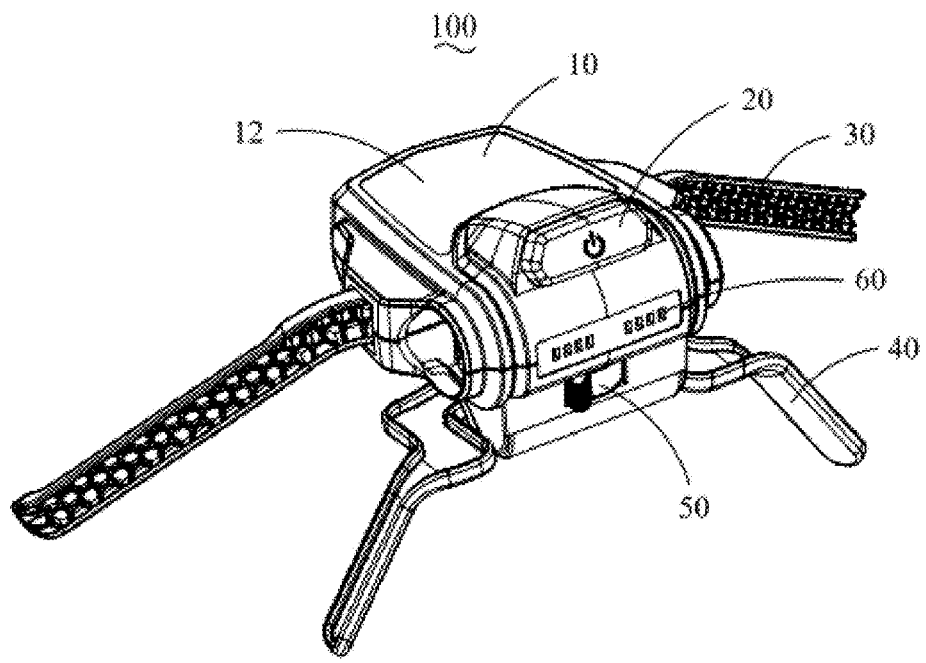
FIG. 1 is a perspective view of a control box in accordance with an embodiment of the present invention.

In order to make the objects, technical solutions and advantages of the present invention more clearly, the present invention will be described in detail below with reference to the drawings and specific embodiments. The specific embodiments of the invention shown in the drawings and described in the drawings are merely exemplary, and the invention is not limited to the embodiments.

It is also to be noted that, in order to avoid obscuring the invention in unnecessary detail, only the structures and/or processing steps closely related to the aspects of the present invention are shown in the drawings, and other details not relevant to the present invention is omitted.

In addition, it should be noted that the terms "comprise" and "comprising" are non-exclusive inclusion, such that a process, method, article, or device that comprises a plurality of elements comprise not only those elements, but also other items not specifically listed, or elements that are inherent to such a process, method, item, or device.

Referring to FIG. 1, a control box 100 of the present invention is used for a garden tool, comprising a casing 10, an activation unit 20, an operation trigger unit 30, a self-propelled trigger unit 40, a speed control unit 50, and an indication unit 60 for indicating electric power.

Figure 2:
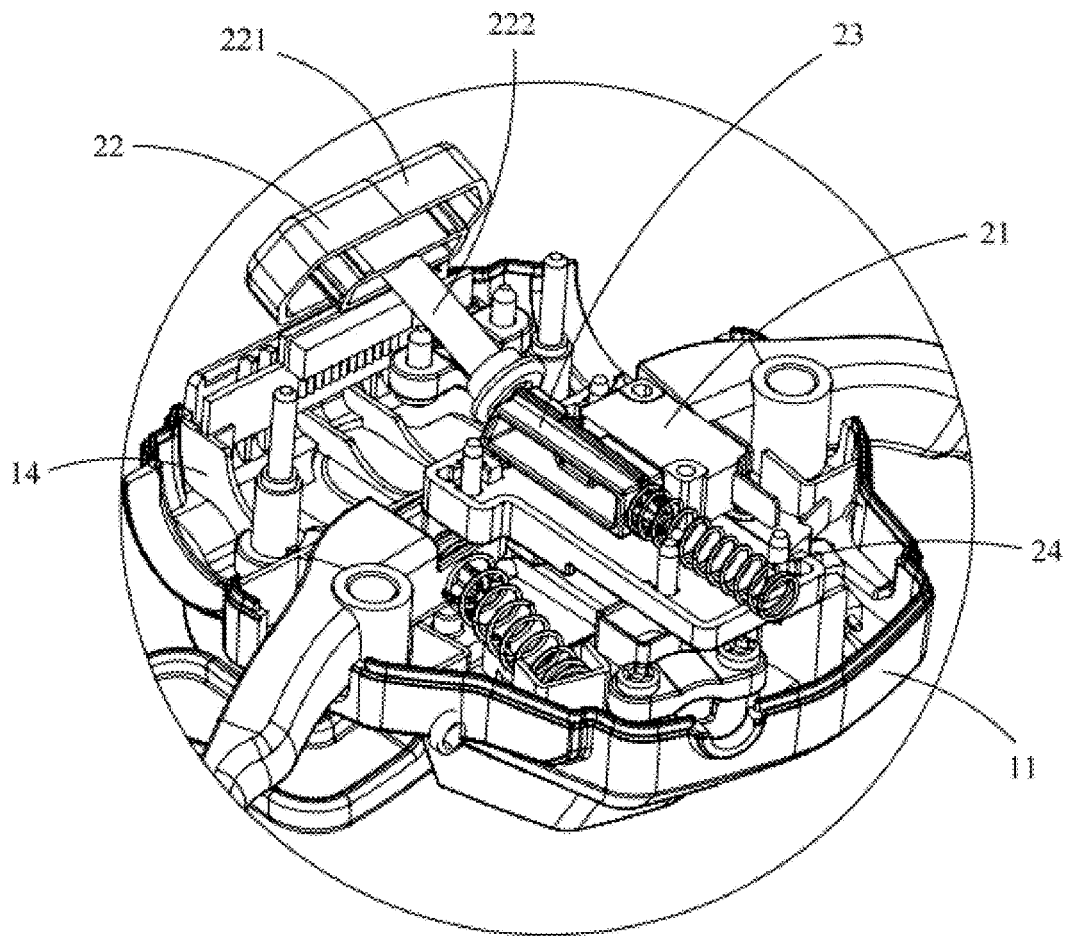
FIG. 2 is a perspective view of an internal structure in a main receiving cavity of the control box shown in FIG. 1.
Figure 6:
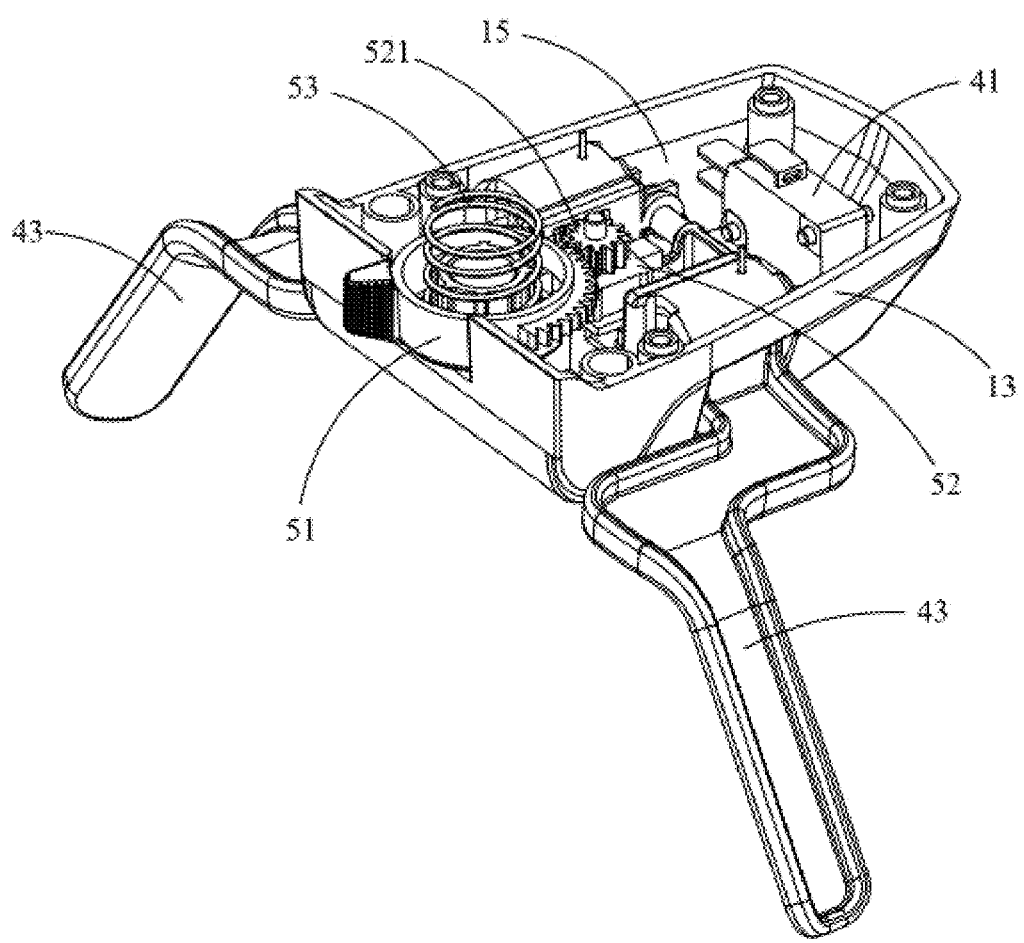
FIG. 6 is a schematic view of the internal structure in an auxiliary receiving cavity of the control box shown in FIG. 1.
Figure 7:
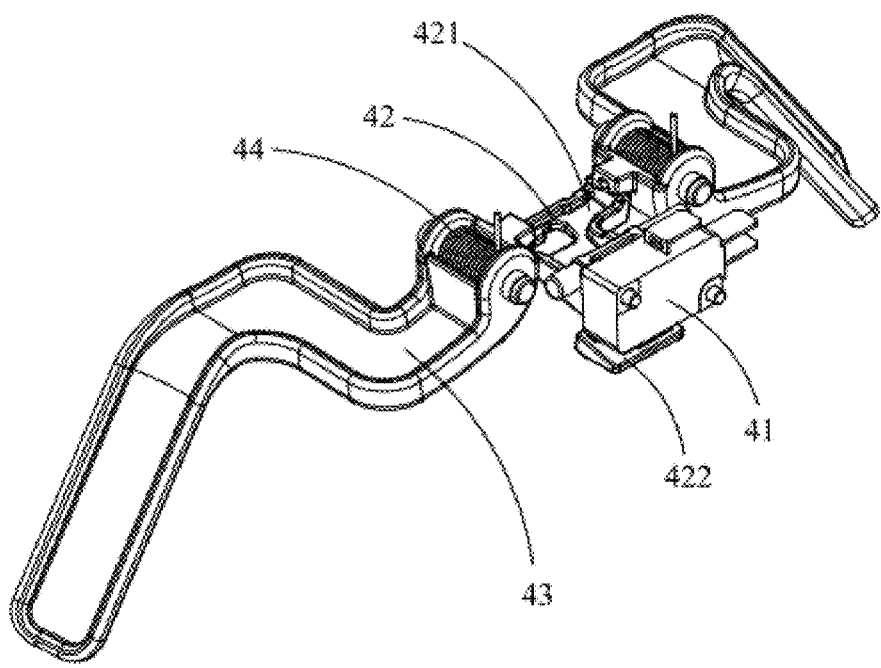
FIG. 7 is a schematic view of a self-propelled trigger unit shown in FIG. 6.
Figure 8:
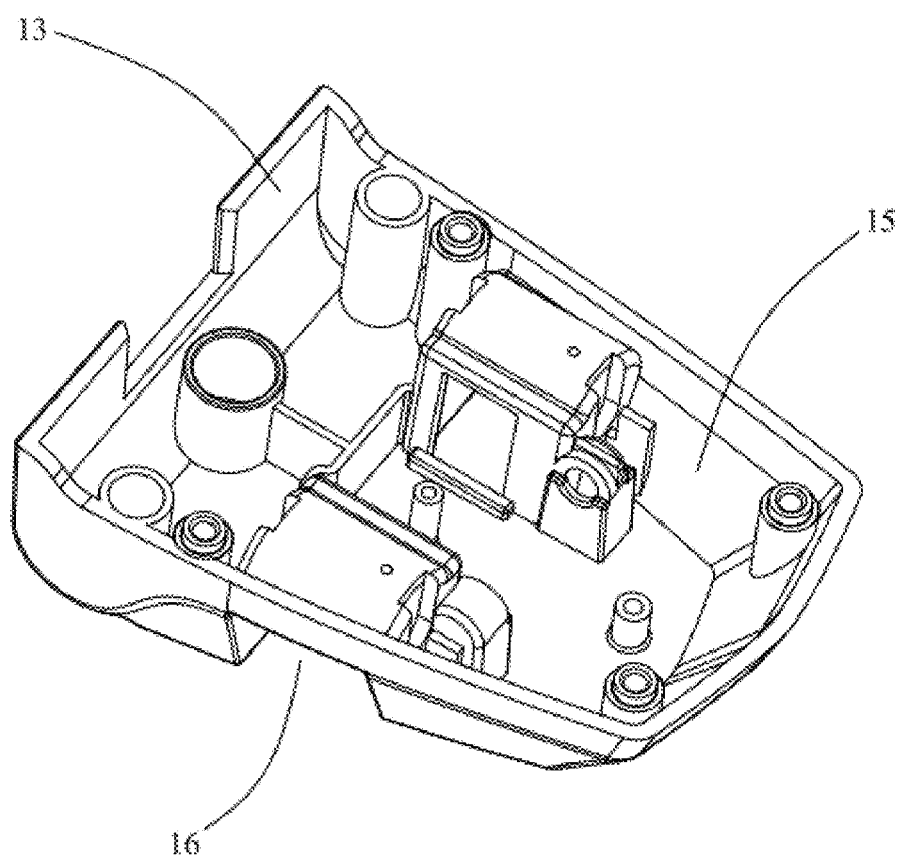
FIG. 8 is a perspective view of s bottom cover shown in FIG. 6.
Figure 9:
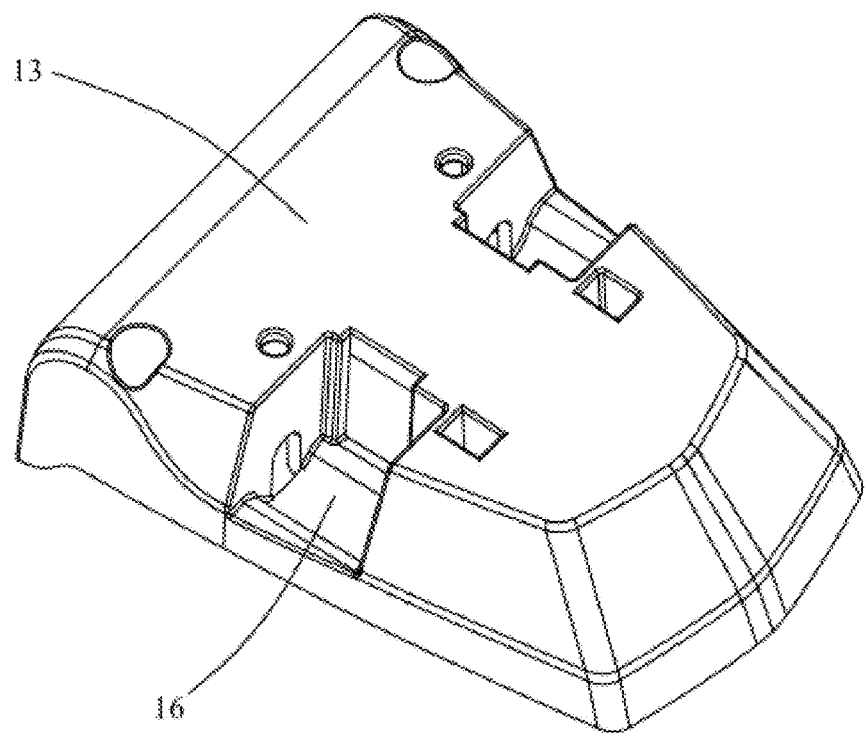
FIG. 9 is another perspective view of the bottom cover shown in FIG. 8.
Figure 10:
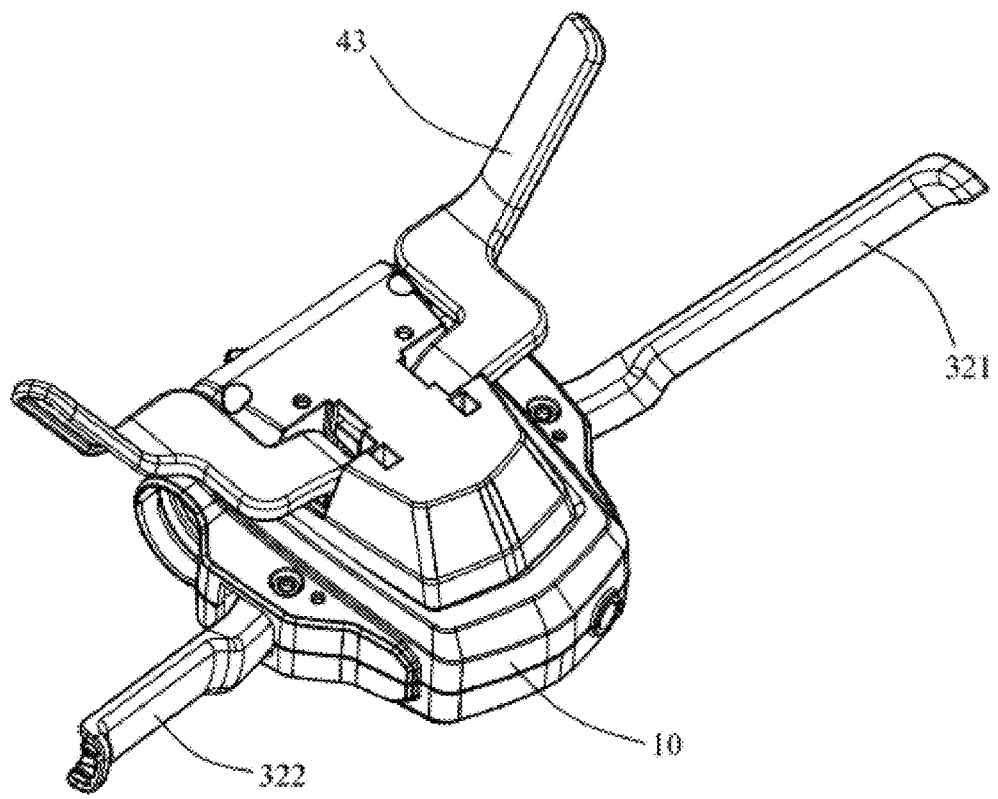
FIG. 10 is another perspective view of the control box shown in FIG. 1.

Referring to FIG. 1, FIG. 2 and FIG. 6, the casing 10 comprises a main body 11, a top cover 12 located above the main body 11, and a bottom cover 13 located below the main body 11. A main receiving cavity 14 is jointly formed by the main body 11 and the top cover 12, and an auxiliary receiving cavity 15 is jointly form by the main body 11 and the bottom cover 13. In this embodiment, the main body 11 and the top cover 12 are fixed to each other by screws.

Referring to FIG. 2, the activation unit 20 comprises a main motor control switch B21, an activation button 22, a slider 23, and a first elastic member 24 for resetting the slider 23. The main motor control switch B21, the slider 23 and the first elastic member 24 are housed in the main receiving cavity 14. The activation button 22 has a part received in the main receiving cavity 14 and another part protruding out of the main receiving cavity 14 for the operator pressing. The activation button 22 comprises a pressing portion 221 and a push rod 222 connected to the pressing portion 221. The push rod 222 is connected to the slider 23, so as to push the slider 23 to slide through the push rod 222 when the pressing portion 221 is pressed. Along the sliding direction of the slider 23, an obtuse angle is formed between the push rod 222 and the slider 23, so that the activation button 22 tilts to the user side. (i.e., diagonal to the user).

Figure 4:
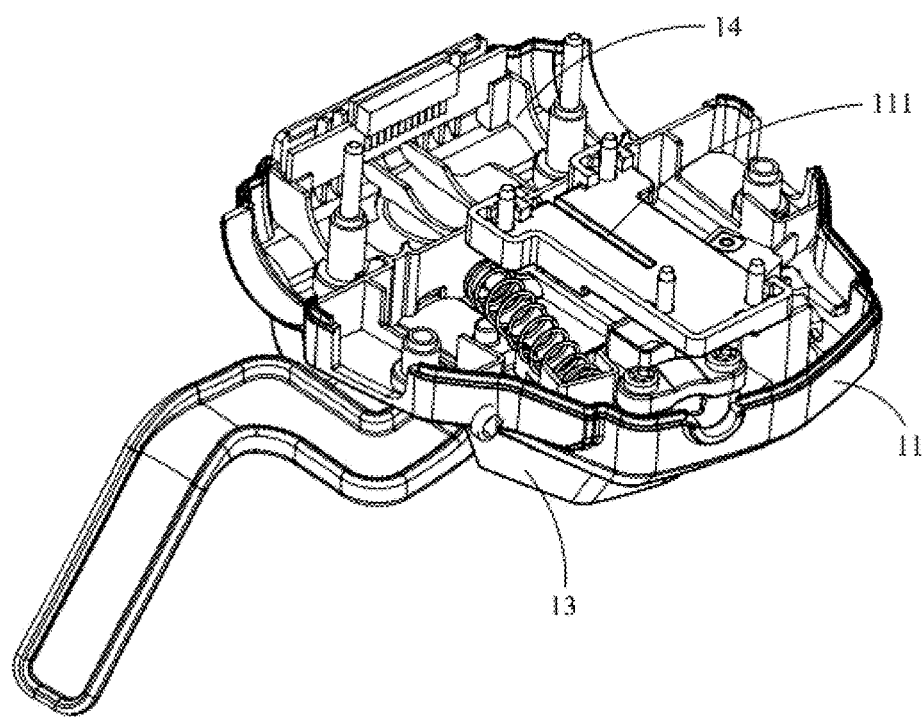
FIG. 4 is a schematic view of the internal structure without an activation unit shown in FIG. 2.
Figure 5:
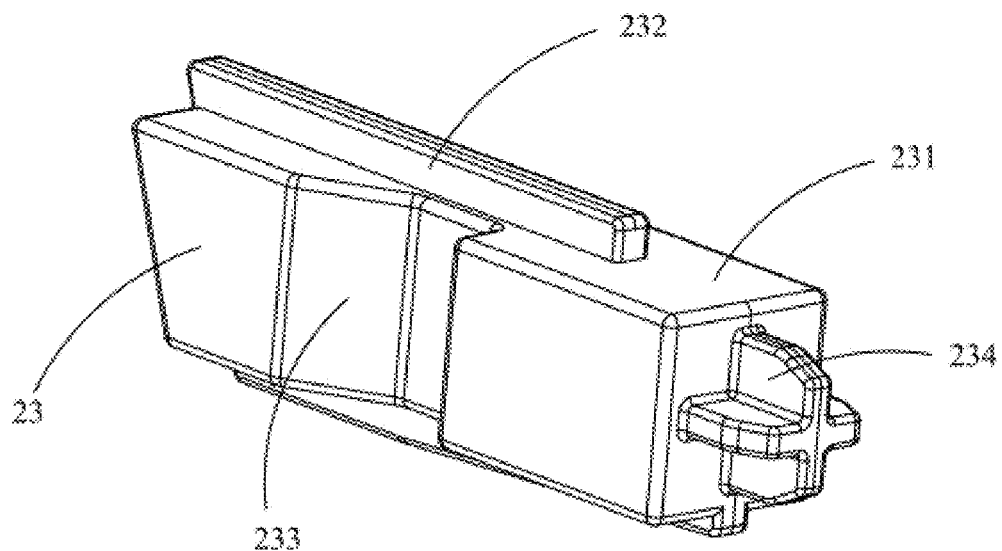
FIG. 5 is a perspective view of a slider shown in FIG. 2.

Referring to FIG. 4 and FIG. 5, the slider 23 comprises a base 231, a fitting member 232 disposed on the base 231, a slanted wall 233, and a positioning block 234. The main body 11 is provided with a guiding member 111 matched with the fitting member 232, so that on the one hand, the slider 23 can be fixed by the cooperation of the guiding member 111 and the fitting member 232, on the other hand, the slider 23 can slide along the guiding member 111. In this embodiment, the guiding member 111 is a guiding groove, and the fitting member 232 is a protrusion that cooperates with the guiding groove. Of course, the specific structure of the guiding member 111 and the fitting member 232 capable of achieving the guiding function has various kinds, and details are not described herein. In addition, the top cover 12 may also be provided with a guide member 111.

The slanted wall 233 is configured to abut the main motor control switch B21. When the slider 23 is sliding, the main motor control switch B21 is in a state of gradually pressed or gradually released under the abutting of the slanted wall 223. The positioning block 234 is configured to cooperate with the first elastic member 24 to fix the first elastic member 24. Preferably, the first elastic element 24 is a spring.

When the pressing portion 221 is pressed by the user, the slider 23 is pushed by the push rod 222 to slide along the guiding member 111. At this time, the trigger button of the main motor control switch B21 is sliding along the slanted wall 233. When the trigger button of the main motor control switch B21 is sliding to the side wall of the slider 23, the main motor control switch B21 is triggered while the first elastic member 24 is in a compressed state; when the pressing portion 221 is released by the user, the activation button 22 and the slider 23 are reset to the initial state by the restoring force of the first elastic member 24.

Figure 3:
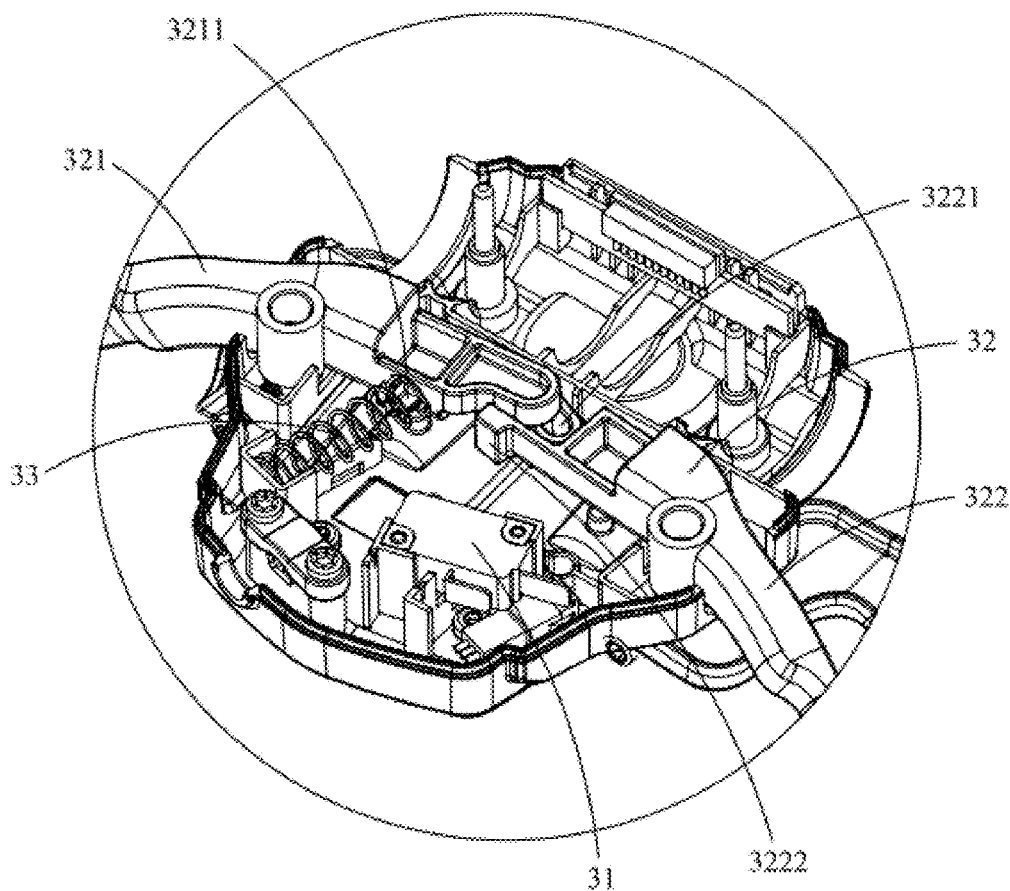
FIG. 3 is a partially enlarged schematic view of the internal structure in the main receiving cavity of the control box shown in FIG. 2.

Please referring to FIG. 1 to FIG. 3, the operation triggering unit 30 comprises a main motor control switch A31, a pin-jointed operating handle 32, and a second elastic member 33 for resetting the operating handle 32. The operating handle 32 comprises a first and second handles 321, 322 cooperating with each other. The first handle 321 and the second handle 322 are respectively located at two sides of the main body 11 and both are configured with long-rod shape.

The main motor control switch A31 and the second elastic member 33 are received in the main receiving cavity 14. Each of the first and second handles 321, 322 has a part received in the main receiving cavity 14 and a part protruding out of the main receiving cavity 14. Specifically, the joint between the first and second handles 321, 322 is received in the main receiving cavity 14, and the other end which is away from the joint is protruded out of the main receiving cavity 14.

The first handle 321 is provided with a positioning post (not shown) and a positioning block 3211. The positioning block 3211 is cooperated with the second elastic member 33 to fix the second elastic member 33 to the first handle 321. The second handle 322 is provided with a displacement groove 3221 cooperating with the positioning post and an abutting portion 3222 abutting against the main motor control switch A31. The first and second handles 321, 322 are interlocked under the cooperation of the positioning post and the displacement groove 3221.

Specifically, when the first handle 321 is pulled, the first handle 321 is rotated, and the second handle 322 is rotated by the first handle 321, and the main motor control switch A31 is abutted by the abutting portion 3222, and the main motor control switch A31 is triggered meanwhile the second elastic member 33 is in a compressed state. When the first handle 321 is released, the first handle 321 is reset by the restoring force of the second elastic member 33, and the second handle 322 is driven to reset. the second handle 322 can also be pulled separately to trigger the main motor control switch A31, or simultaneously pull the first and second handles 321, 322 to jointly trigger the main motor control switch A31.

Referring to FIG. 6 to FIG. 10, the self-propelled trigger unit 40 comprises a self-propelled control switch S41, a pin-jointed lever 42 matching with the self-propelled control switch S41, and a pin-jointed control handle 43 and a third elastic element 44 for resetting the control handle 43. The self-propelled control switch S41 and the lever 42 are received in the auxiliary receiving cavity 15. The bottom cover 13 is further provided with a receiving slot 16 communicating with the auxiliary receiving cavity 15. The third elastic member 44 is received in the receiving slot 16, and the control handle 43 is partially received in the auxiliary receiving cavity 15 and the receiving slot 16, and partially protrudes out of the auxiliary receiving cavity 15.

The lever 42 comprises a first end 421 cooperating with the control handle 43 and a second end 422 engaging with the self-propelled control switch S41. The third elastic element 44 is a torsion spring.

In this embodiment, two control handles 43 are provided and are disposed at two sides of the self-propelled control switch S41, and each of the control handles 43 has a long bar Z-shape and is fixed on the bottom cover 13 through a cylindrical pin (not shown). Two third elastic elements 44 and two receiving slots 16 are also correspondingly disposed at two sides of the bottom cover 13, so that the two third elastic members 44 are respectively connected to the two control handles 43 to drive the corresponding control handle 43 to reset.

When any one of the control handles 43 is pulled, the lever 42 is rotated through the control handle 43 downwardly abutting against the first end 421 thereof, and the self-propelled control switch S41 is triggered when upwardly abutted by the second end 422 of the lever 42, meanwhile the third elastic member 44 is in a compressed state. When the control handle 43 is released, the control handle 43 and the lever 42 are reset by the restoring force of the third elastic member 44.

Figure 11:
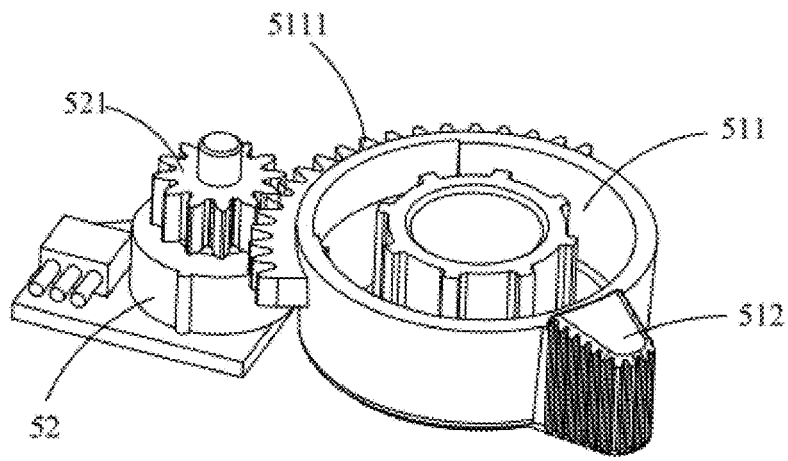
FIG. 11 is a schematic view of a speed regulation unit shown in FIG. 6.

Referring to FIG. 6 and FIG. 11, the speed control unit 50 comprises a speed control knob 51, a variable electronic component 52, and a fourth elastic component 53. The variable electronic component 52 is preferably a variable resistor, and in the embodiment of the present invention, the variable resistor is a potentiometer. The potentiometer 52 and the forth elastic member 53 are received in the auxiliary receiving cavity 15, and the speed control knob 51 is partially received in the auxiliary receiving cavity 15 and partially protrudes out of the auxiliary receiving chamber 15.

The speed control knob 51 comprises a pin-jointed rotating portion 511 and a dial portion 512 located at a side edge of the rotating portion 511. A driving gear 5111 is disposed on the rotating portion 511, and the dial portion 512 is provided with an anti-slip pattern. The potentiometer 52 is provided with a driven gear 521 cooperating with the driving gear 5111.

The fourth elastic member 53 is located between the main body 11 and the speed control knob 51 to increase damping. In this embodiment, the fourth elastic member 53 is a compression spring. When the dial portion 512 is pushed, the speed control knob 51 is rotated, so that the driven gear 521 is driven to rotate by the driving gear 5111, and then the potentiometer 52 is rotated to adjust the walking speed of mower.

Referring to FIG. 1, the indicating unit 60 is located on the side wall of the casing 10 that is near the operator and comprises two sets of LED lights to respectively correspond to two battery packs. Each set of LED lights comprises four LED lights corresponding to one battery pack. The number of displays for each group of LED lights varies according to the battery pack's power. When the battery pack power is greater than or equal to the maximum preset value, all four LED lights are turned on; when the battery pack power is less than or equal to the minimum preset value, all four LED lights are turned off to remind the user to charge the battery pack. Of course, there are many corresponding relationships between the battery pack and the LED light group, which belong to the prior art, and will not be further described herein.

Figure 12:
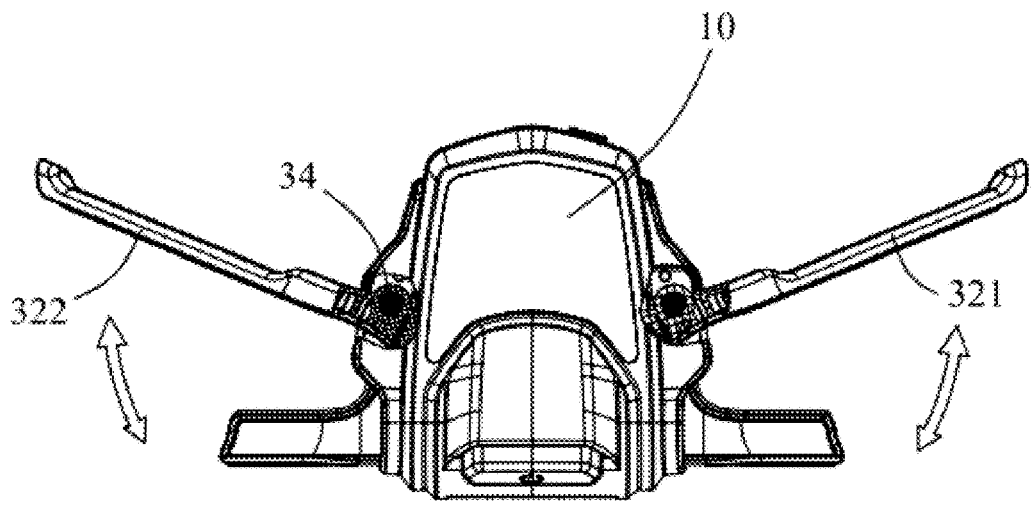
FIG. 12 is a partial cross-sectional view of the control box along a top view direction shown in FIG. 1.
Figure 13:
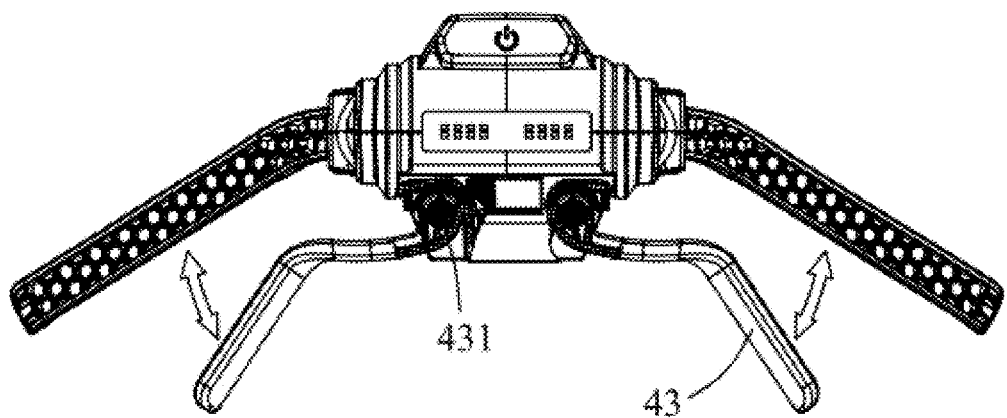
FIG. 13 is a partial cross-sectional view of the control box along a front view direction shown in FIG. 1.

Referring to FIG. 12 and FIG. 13, the plane of the top cover 12 is defined as a first plane, and the plane of the side wall of the casing 10 is defined as a second plane. In this embodiment, the second plane is substantially perpendicular to the first plane. The first and second handles 321, 322 swing back and forth in the first plane (i.e., in a top view direction) when pulled, and the rotating shafts 34 of the first and second handles 321, 322 are substantially perpendicular to the first plane; and the control handle 43 swings up and down in the second plane (i.e., in a front view direction) when pulled, the rotating axis 431 of the control handle 43 is parallel to the first plane. In this embodiment, the rotating shafts 34 of the first handle 321 and the second handle 322 are substantially perpendicular to the rotating axis 431 of the control handle 43. Of course, in other embodiments, it can be other angles, the angle range is 90°±30°. The purpose is that when grasping, the operator generally grasps the control handle 43 with the thumb, grasps the first and second handles 321, 322 with the other fingers, thus the control handle 43 is set to swing up and down in the second plane, the first handle 321 and the second handle 322 are arranged to swing back and forth in the first plane, which is not only ergonomic, but also convenient to control and use the control box 100.

Figure 14:
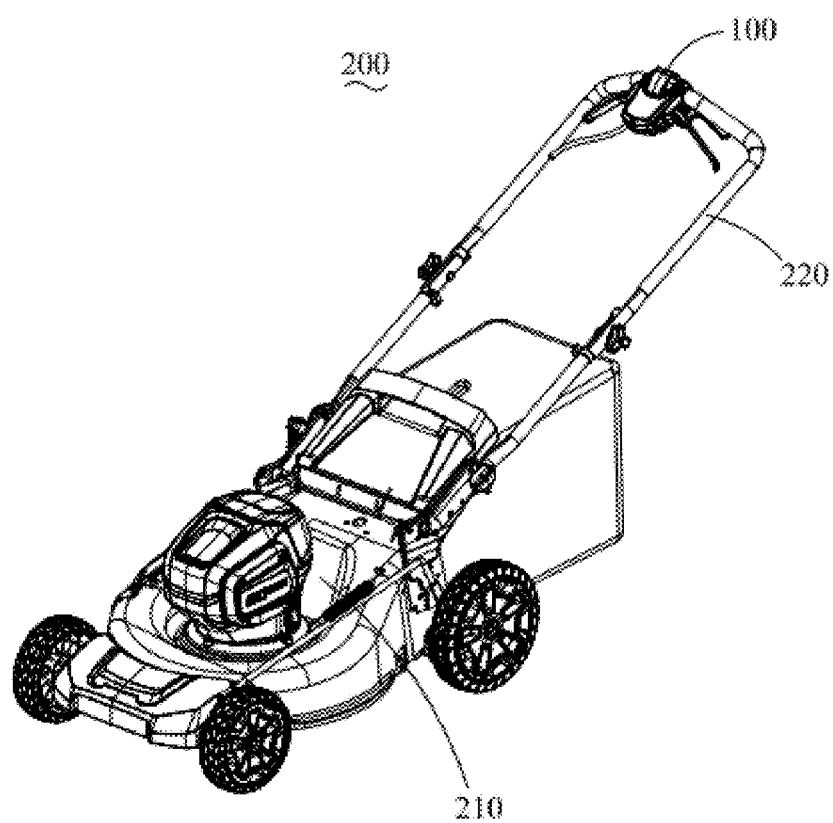
FIG. 14 is a perspective view of a garden tool in accordance with an embodiment of the present invention.

Referring to FIG. 14, the present invention also discloses a garden tool 200 including a body 210, a handle 220 extending rearwardly from the body 210, and a control box 100 mounted on the handle 220. The control box 100 is tilted toward the user (i.e., tilted toward the user side) and is fixed to the handle 220 by screws. In the present invention, the garden tool 200 can be a lawn mower, a snow blower or other marching type garden tools, and is not limited herein.

The body 210 comprises a front walking wheel, a rear walking wheel, a first driving motor for driving the front walking wheel, a second driving motor for driving the rear walking wheel, and a control board that connects the first driving motor and the second driving motor. The control board is coupled to the control box 100 to control the first driving motor and the second driving motor by outputting a control signal to the control board.

The handle 220 is U-shaped, and the control box 100 is disposed substantially at an intermediate position of the handle 220 to facilitate the user to operate the control box 100.

When the garden tool 200 need to be started, first of all, pressing the activation button 22 to trigger the main motor control switch B21 to activate the garden tool 200; then, pulling the first handle 321 or the second handle 322 (or simultaneously pull the first handle 321 and the second handle 322) to make the main motor control switch A31 to be triggered, at this time the garden tool 200 is activated and starts to work, and the activation button 22 can be released.

When the first handle 321 or the second handle 322 is released (or the first handle 321 and the second handle 322 are simultaneously released), the garden tool 200 is stop working.

It should be noted that when the garden tool 200 is started, the control board needs to simultaneously detect the control signals from both the main motor control switches A31, B21; After the garden tool 200 is started, if any one of the main motor control switch A31 and the main motor control switch B21 sends a signal to the control board, the garden tool 200 can work normally; when neither the main motor control switch A31 nor the main motor control switch B21 sends a signal to the control board, the garden tool 200 is stop working.

When the garden tool 200 needs to walking, pulling any one of the control handles 43 to trigger the self-propelled control switch S41, so that the garden tool 200 starts to walk; when the control handle 43 is released, the garden tool 200 stops walking; when it is necessary to control the walking speed of the garden tool 200, toggling the speed control knob 51 to rotate the potentiometer 52, then adjusting the walking speed of the first driving motor and the second driving motor, thereby adjusting the walking speed of the garden tool 200.

Compared with the prior art, the control box 100 of the invention has reasonable switch distribution and simple operation and can effectively improve the user experience.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

The invention claimed is:

1. A control box for a garden tool, comprising:
a self-propelled trigger unit including a self-propelled control switch S, a lever matching with the self-propelled control switch S and a control handle; and
a casing being provided with a receiving cavity for partially receiving the self-propelled trigger unit;
wherein the lever abuts and triggers the self-propelled control switch S when the control handle is pulled to abut the lever and the control handle swings up and down in a plane where a side wall of the casing is located.

2. The control box according to claim 1, wherein the control box further comprises:
an activation unit including a main motor control switch B, an activation button, a slider and a first elastic member for resetting the slider, the slider abutting and triggering the main motor control switch B under the action of the activation button; and
an operation triggering unit including a main motor control switch A, an operating handle, and a second elastic member for resetting the operating handle, the operating handle abutting and triggering the main motor control switch A when pulled;
wherein the main motor control switches A and B, the slider, the first elastic element and the second elastic element are received in the receiving cavity, and the activation button and the operating handle are at least partially received in the receiving cavity.

3. The control box according to claim 2, wherein the casing is provided with a guiding member, and the slider is provided with a fitting member cooperating with the guiding member, and wherein the slider slides along the guiding member under the action of the guiding and fitting members.

4. The control box according to claim 2, wherein the activation button comprises a pressing portion and a push rod connected to the pressing portion, and wherein the push rod is coupled to the slider and pushes the slider to slide when the pressing portion is pressed.

5. The control box according to claim 2, wherein the operating handle comprises a first handle and a second handle respectively located at two sides of the casing, and wherein the first handle is provided with a positioning post, and the second handle is provided with a displacement slot cooperating with the positioning post, and wherein the second or first handle synchronously rotates under the action of the positioning post and the displacement slot when the first or second handle is pulled.

6. The control box according to claim 5, wherein the upper surface of the casing is located in a first plane, and wherein the first and second handles swing back and forth in the first plane.

7. The control box according to claim 1, wherein the control box is also provided with a third resilient element for resetting the control handle.

8. The control box according to claim 1, wherein the control box is further provided with a speed control unit, and wherein the speed control unit comprises a speed control knob and a variable electronic component, and wherein the variable electronic component is provided with a driven gear, and the speed control knob is provided with a driving gear matching with the driven gear.

9. The control box according to claim 8, wherein a fourth elastic element is further disposed between the speed control knob and the casing.

10. A garden tool, comprising: a handle and a control box as described in claim 1; wherein the control box is fitted on the handle and obliquely facing the user.

* * * * *